United States Patent
Happel et al.

(10) Patent No.: US 7,846,327 B2
(45) Date of Patent: Dec. 7, 2010

(54) STORM WATER FILTER SYSTEM HAVING A FLOATING SKIMMER APPARATUS

(76) Inventors: Henry Happel, Rockledge, FL (US); Dolores J. Happel, legal representative, 140 Ruby St., Rockledge, FL (US) 32955; Thomas H. Happel, 5041 Scott Rd., Cocoa, FL (US) 32926

( * ) Notice: Subject to any disclaimer, the term of this patent is extended or adjusted under 35 U.S.C. 154(b) by 78 days.

(21) Appl. No.: 12/315,820

(22) Filed: Dec. 8, 2008

(65) Prior Publication Data
US 2009/0166279 A1 Jul. 2, 2009

Related U.S. Application Data

(60) Provisional application No. 61/009,086, filed on Dec. 27, 2007.

(51) Int. Cl.
*E03F 5/14* (2006.01)
(52) U.S. Cl. ............... 210/155; 210/162; 210/170.03; 210/242.1; 210/305; 210/307; 210/538; 210/532.1
(58) Field of Classification Search ............... 210/122, 210/155, 162, 170.03, 242.1, 299, 305, 307, 210/521, 532.1, 538, 540
See application file for complete search history.

(56) References Cited

U.S. PATENT DOCUMENTS

| | | | | |
|---|---|---|---|---|
| 4,268,396 A * | 5/1981 | Lowe | ...................... | 210/532.1 |
| 5,078,863 A * | 1/1992 | Durigon | .................. | 210/242.1 |
| 5,378,376 A * | 1/1995 | Zenner | ..................... | 210/242.1 |
| 6,797,161 B2 * | 9/2004 | Use et al. | ..................... | 210/305 |
| 6,800,195 B1 * | 10/2004 | Batten et al. | ................. | 210/307 |
| 6,869,525 B1 | 3/2005 | Happel | | |
| 7,294,256 B2 | 11/2007 | Happel et al. | | |
| 2005/0218049 A1 * | 10/2005 | Happel | ..................... | 210/242.1 |
| 2010/0032363 A1 * | 2/2010 | Happel | ..................... | 210/242.1 |
| 2010/0078370 A1 * | 4/2010 | Happel | ........................ | 210/122 |

* cited by examiner

*Primary Examiner*—Christopher Upton
(74) *Attorney, Agent, or Firm*—William M. Hobby, III

(57) ABSTRACT

A storm water filter box has a floatable skimmer apparatus for preventing floatable debris from entering the filter box outlet. The filter box has an inlet and an outlet and an inlet filter located in the filter box housing. A portable skimmer is positioned in the box between the inlet and outlet and will rise and fall with the water level in the filter box to keep the top of the skimmer above the water level and force the storm water passing through the filter box under the floatable skimmer thereby blocking floatable debris from entering the filter box outlet.

12 Claims, 2 Drawing Sheets

US 7,846,327 B2

STORM WATER FILTER SYSTEM HAVING A FLOATING SKIMMER APPARATUS

This application claims the benefit of U.S. Provisional Application No. 61/009,086, filed Dec. 27, 2007.

BACKGROUND OF THE INVENTION

The present invention is a storm water filter system which includes a filter and filter box for filtering drain water before directing the water into an outlet for discharging the filtered storm water. More specifically, the present invention is directed towards a filter box skimmer for preventing floatable trash and floatable oil from entering the outlet from the filter box.

Drain water, which is frequently laden with trash, grass clippings, tree limbs, sand, gravel and other forms of sediment, as well as floatable trash and floatable oil is collected from streets, parking lots and other areas into a storm drain inlet where it is directed into a storm drain pipe system. The drain water laden with trash collected from the streets is fed through an entrance into a storm water catch basin and into a lake or retention pond. The retention pond can tolerate a certain amount of grass clippings collected from parking lots along the streets but debris left in water for a long period of time decays and allows a build up of soluble nutrients, such as nitrates and phosphates to accumulate in the water. Thus, it is desirable to remove organic debris from the water collected from the drain water before it enters lakes and retention ponds. At the same time, drain water collects residue oil, and floatable hydrocarbons and organic materials from parking lots and streets and it is also desirable to prevent the floating hydrocarbons being discharged into the lakes or retention ponds. Typically, a skimmer is utilized to capture hydrocarbons and floating liquids within a baffle box to prevent their passing into the outlet.

The present invention is directed towards a skimmer to prevent floatable trash and floatable hydrocarbons from passing out the outlet of a storm water drain system baffle box.

In my prior U.S. Pat. No. 6,869,525 for a Storm Drain Filter System I show a storm drain filter system which includes a skimmer for collecting floating hydrocarbons and for absorbing the hydrocarbons in a hydrocarbon absorbing boom while preventing them from passing out of the skimmer. In my prior U.S. Pat. No. 7,294,256 for a Storm Water Filter System, a storm water filter system is provided for filtering storm water being fed into an in-ground well and uses a fixed skimmer to prevent floating organic debris from entering the discharge into the in-ground recharge well.

The present invention is directed towards an improvement in storm water filter systems and filter boxes in which the filter box has a skimmer protecting the outlet from the baffle box of hydrocarbons and floating oil and the like. Drain water entering a baffle box sometimes flows in very fast and allows the water to rise above a fixed skimmer. This allows floating trash and floating oil and hydrocarbons to go over the top of the skimmer and out the outflow pipe into rivers, lakes or retention ponds. The present invention provides for a floating skimmer that prevents this overflow and forces the drain water existing the baffle box to go under the skimmer and out the outlet.

A relative short skimmer that floats will have the same performance of a much taller fixed skimmer without the head loss associated with a taller skimmer. A storm water treatment structure that makes use of a floating skimmer can be more easily retrofitted to an existing water shed storm drain system due to the minimal head loss of the shorter skimmer.

SUMMARY OF THE INVENTION

A storm water filter box has a floatable skimmer apparatus for preventing floatable debris from entering the filter box outlet. The storm water filter box has a housing chamber having an inlet thereinto and an outlet therefrom and an inlet filter located in the chamber adjacent the inlet for filtering out solids in the storm water entering the box. A floatable skimmer is positioned in the housing chamber between the inlet and outlet of the housing chamber and is slidable mounted in a skimmer track. The floatable skimmer has a floatation thereon mounted to raise and lower the skimmer with the rise and fall of storm water in the filter box to hold the top of the floatable skimmer above the water level and thereby force storm water under the floatable skimmer while blocking floatable debris from entering the filter box outlet. The filter box filter may be a filter basket with an inlet facing the filter box inlet. The filter box may have a plurality of baffles mounted therein. The floatable skimmer track includes a pair of tracks mounted in the filter box chamber side walls, each track having elongated grooves therein for the floating skimmer side edges to slide in the pair of grooved tracks as the water level rises and falls in the filter box. The track groove has a self-lubricating polymer surface or it can be made of a self-lubricating polymer. The floating skimmer has top and bottom edges with the bottom edge finding a channel thereunder for the passage of water therethrough and a top edge having a strip of floatation material mounted adjacent thereto for floating the skimmer in water in the filter box to hold the top edge of the floating skimmer above the water level. The floatation material may be polystyrene or the like. The floating skimmer also has skimmer seals attached thereto and extending over each side edge thereof to ride against each track to seal the space between the skimmer and the track, which skimmer seals may be made of a self-lubricating polymer.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
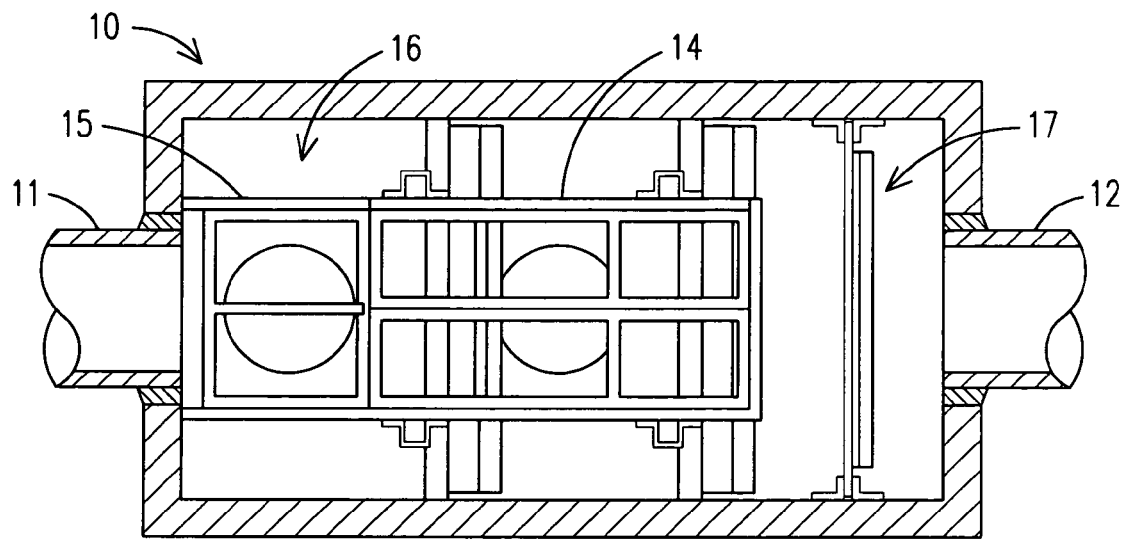
FIG. 1 is a sectional view of a storm drain filter system and baffle box.
Figure 2:
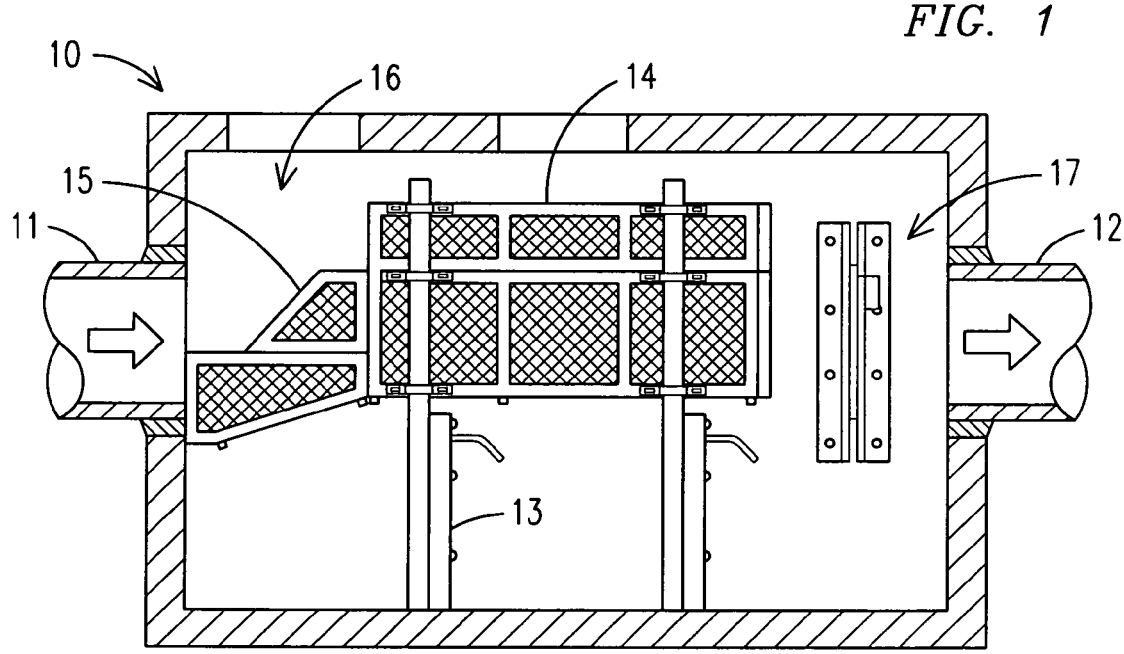
FIG. 2 is a side sectional view of the baffle box of FIG. 1.
Figure 3:
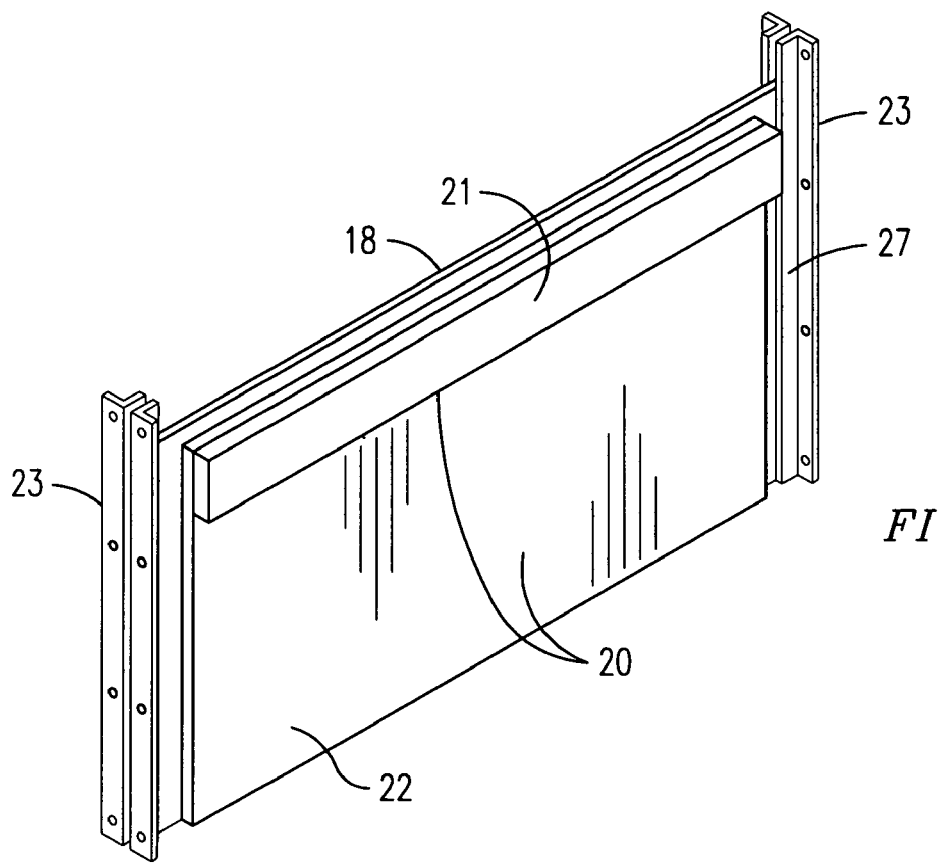
FIG. 3 is a perspective view of a floating skimmer in accordance with the present invention.

Referring to the drawings of FIGS. 1 through 3, a baffle box 10 is typically made of concrete and has an inlet 11 and an outlet or discharge 12. The box 10 may have a plurality of water baffles 13. The storm water baffle or filter box 10 also includes a screen filter basket 14 which includes a screen filter ramp for directing storm water in the storm water drain through the inlet 11 and into the basket 14 which collects leaves, trash, debris and the like while filtering sand and heavier solids into the basin 16. The storm water entering the inlet 11 passes through the filter basket 14 and through baffle box 10 and out the outlet 12 while collecting leaves and debris in the filter basket 14 while sand and the like collects in the basin 16. Floating oil and hydrocarbons can pass through the filter basket 14 and will not sink into the basin 16. These floating organic materials are blocked from the filter box outlet 12 by a skimmer 17 which forces the filtered storm water under the skimmer 17 to reach the outlet 12.

However, there are times when the water enters the inlet 11 very fast and forces the water to go over the top of a fixed skimmer and allows the floating oil and hydrocarbons to escape into the outlet 12. The present skimmer 17 is a floating skimmer and has a skimmer 18 which can be made of plastic or metal sheet material and has skimmer floats 20 attached to one side thereof which includes a skimmer bar 21 and a flat floating skimmer surface 22. The skimmer floats may be made of a polystyrene or any floating materials, which lifts the skimmer 18 in the water within the baffle box 10. The skimmer 18 slides in a pair of tracks 23 which may also be made of metal, plastic or the like. If the tracks 23 or skimmer 18 are made of a self-lubricating type polymer, the skimmer 18 can easily slide within the tracks 23.

Figure 5:
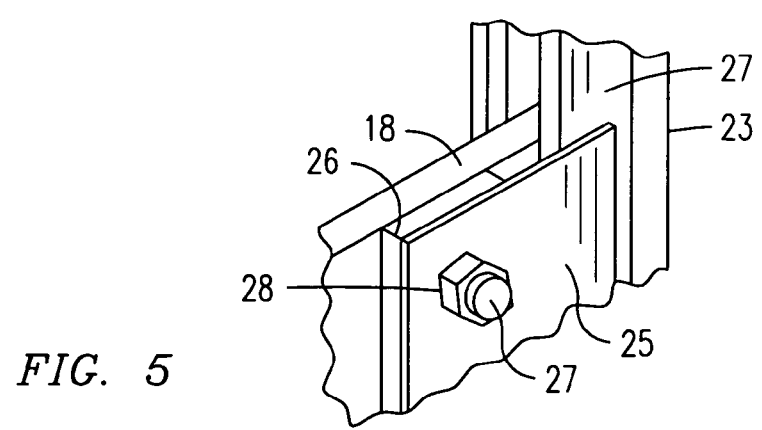
FIG. 5 is a partial perspective view of a water resistant seal of the skimmers of FIGS. 3 and 4.

The skimmer 18 also includes a seal 24 as seen in FIG. 5 which has a self-lubricating polymer seal member 25, such as a sheet of TEFLON or other polymer which is attached to a spacer strip 26 which in turn is attached to the skimmer 18. The parts may be attached together with a bolt 27 and a nut 28, as seen in FIG. 5. The skimmer seal 25 slides along the track wall 27 of each track 23. The seal 25 is placed on the inside side of the skimmer 18 so that water flowing against the skimmer applies a small amount of pressure against the surface of the seal member 25 to hold it in contact with the track wall 27 of the track 23 to provide a slippery plastic seal to prevent oil or hydrocarbons and debris from passing around the end of the floating skimmer 18.

Figure 4:
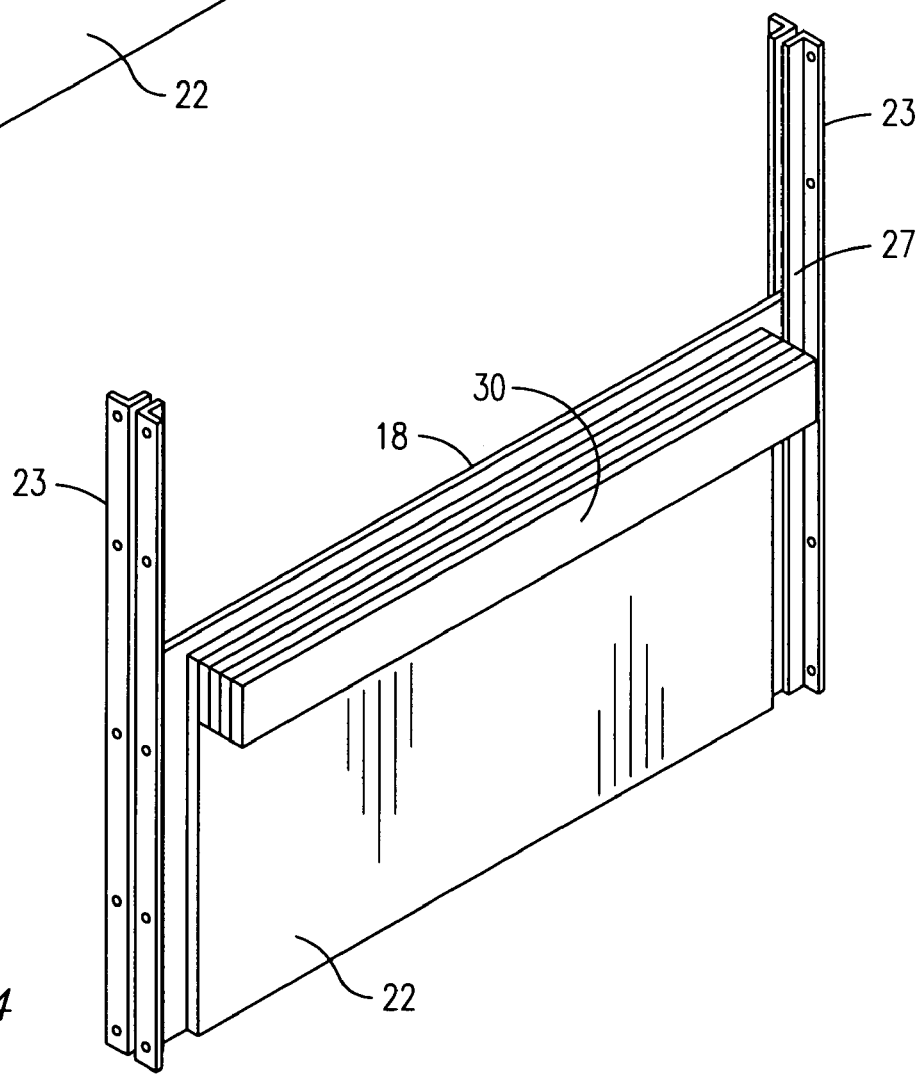
FIG. 4 is a perspective view of a second embodiment of the floating skimmer of FIG. 3.

FIG. 4 shows a skimmer 17 having the skimmer 18 for riding in the pair of tracks 23 between the track walls 27 and having a flat floating surface 22 attached to the skimmer 18, as shown in FIG. 3. It has additional floats or floating material 30 attached thereto for adding increased floatation to the skimmer 18.

It should be clear at this point that a floating skimmer has been provided for an in-line storm water drain filter system or baffle box which floating skimmer can be used in any storm water filter system for skimming floating hydrocarbons, oil and organic materials from entering an outlet and maintaining them within a box or drain system. However, the present invention should not be considered limited to the forms shown which are to be considered illustrative rather than restrictive.

We claim:

1. A storm water filter box having a floatable skimmer apparatus for preventing floatable debris from entering the filter box outlet comprising:
    a housing chamber having an inlet thereinto and an outlet therefrom;
    an inlet filter located in said housing chamber adjacent said inlet for filtering out solids in entering storm water; and
    a floatable skimmer positioned in said housing chamber between the inlet and outlet of said housing chamber, said skimmer being movably mounted in a skimmer track and having floatation thereon mounted to raise and lower said skimmer with the rise and fall of storm water in said filter box to thereby block floatable debris from passing through said filter box, said floating skimmer having top and bottom edges, said bottom edge defining a variable channel opening thereunder for the passage of water thereunder;
    whereby storm water is forced under said floatable skimmer while blocking floatable debris from entering said filter box outlet.

2. The storm water filter box having a floatable skimmer apparatus in accordance with claim 1 in which said inlet filter is a filter basket.

3. The storm water filter box having a floatable skimmer apparatus in accordance with claim 2 in which said filter basket has an inlet facing said housing chamber inlet.

4. The storm water filter box having a floatable skimmer apparatus in accordance with claim 3 in which said housing chamber has a plurality of baffles mounted therein.

5. The storm water filter box having a floatable skimmer apparatus in accordance with claim 2 in which said floating skimmer floatation material includes a strip of floatation material mounted adjacent the top edge thereof for floating said skimmer in water in said filter box to hold the top edge of said floating skimmer above the water level when said water in said housing chamber rises above a predetermined level.

6. The storm water filter box having a floatable skimmer apparatus in accordance with claim 5 in which said floating skimmer floatation material includes a plurality of strips of floatation material mounted thereto.

7. The storm water filter box having a floatable skimmer apparatus in accordance with claim 5 in which said floating skimmer strip of floatation material is a strip of polystyrene.

8. The storm water filter box having a floatable skimmer apparatus in accordance with claim 1 in which said floatable skimmer track includes a pair of tracks mounted in said housing chamber, each said track having an elongated groove therein.

9. The storm water filter box having a floatable skimmer apparatus in accordance with claim 8 in which each said floating skimmer has a pair of side edges, one said side edge sliding in each of said pair of tracks groove.

10. The storm water filter box having a floatable skimmer apparatus in accordance with claim 9 in which each said track groove has a self lubricating polymer surface.

11. The storm water filter box having a floatable skimmer apparatus in accordance with claim 9 in which said floating skimmer has a skimmer seal attached thereto and extending over each side edge thereof to ride against each track to seal the space between said floating skimmer and said pair of tracks.

12. The storm water filter box having a floatable skimmer apparatus in accordance with claim 11 in which each said floating skimmer seal is made of a self-lubricating polymer.

* * * * *